United States Patent
Ohzawa

(10) Patent No.: US 8,954,277 B2
(45) Date of Patent: Feb. 10, 2015

(54) ADDING VISUAL IMAGE OF TRAFFIC CONDITION TO HELP DRIVER DETERMINE A ROUTE FROM MULTIPLE OPTIONS

(71) Applicants: DENSO International America, Inc., Southfield, MI (US); Denso Corporation, Kariya-shi, Aichi-ken (JP)

(72) Inventor: Yoshiki Ohzawa, Novi, MI (US)

(73) Assignees: DENSO International America, Inc., Southfield, MI (US); Denso Corporation, Kariya-shi, Aichi-ken ( * ) Notice: Subject to any disclaimer, the term of this patent is extended or adjusted under 35 U.S.C. 154(b) by 0 days.

(21) Appl. No.: 13/895,901

(22) Filed: May 16, 2013

(65) Prior Publication Data

US 2014/0343849 A1    Nov. 20, 2014

(51) Int. Cl.
GO1C 21/34    (2006.01)
(52) U.S. Cl.
CPC .................................. *GO1C 21/3492* (2013.01)
USPC ......................................................... 701/537
(58) Field of Classification Search
USPC ........................................................ 701/537
See application file for complete search history.

(56) References Cited

U.S. PATENT DOCUMENTS

| | | | |
|---|---|---|---|
| 6,006,161 A * | 12/1999 | Katou | 701/410 |
| 2007/0118281 A1 | 5/2007 | Adam et al. | |
| 2009/0327508 A1 | 12/2009 | McCarthy et al. | |
| 2012/0002074 A1 | 1/2012 | Baba et al. | |

FOREIGN PATENT DOCUMENTS

| | | |
|---|---|---|
| JP | 2005-291981 | 10/2005 |
| JP | 2005-331305 | 12/2005 |
| JP | 2009-516189 | 4/2009 |
| JP | 2011-160090 | 8/2011 |

* cited by examiner

*Primary Examiner* — Mary Cheung
*Assistant Examiner* — Anne Mazzara
(74) *Attorney, Agent, or Firm* — Harness, Dickey & Pierce, P.L.C.

(57) ABSTRACT

A visual image monitoring system for use in association with a vehicular navigation system is operable to locate traffic cameras and transmit visual images from the traffic cameras along at least first and second routes to a destination so as to provide a visual comparison of traffic conditions to the vehicle operator.

12 Claims, 3 Drawing Sheets

ADDING VISUAL IMAGE OF TRAFFIC CONDITION TO HELP DRIVER DETERMINE A ROUTE FROM MULTIPLE OPTIONS

FIELD

The present disclosure relates generally to navigation systems for motor vehicles and, more particularly, to navigation systems providing visual images of real-time traffic condition to permit the vehicle operator to make visual route comparisons for determining a preferred travel route.

BACKGROUND

This section provides background information related to the present disclosure which is not necessarily prior art.

Navigation systems are becoming increasingly popular as a convenience accessory in many motor vehicles. As is well known, navigation systems typically assist the vehicle operator by locating destinations, providing primary and alternative routes and advising of local traffic and construction areas, as well as other useful information. Unfortunately, the data relating to current traffic flow conditions and/or traffic accident locations may be delayed so as not to be displayed by the navigation system in a timely fashion. Accordingly, as vehicular navigation systems continue to advance and provide additional useful information, it would be desirable to provide the vehicle operator with real-time visual route comparisons to assist in avoiding traffic delays and selection of a preferred route.

SUMMARY

This section provides a general summary of the disclosure, and is not a comprehensive disclosure of its full scope or all of its features.

It is an aspect of the present disclosure to provide a navigation system for use in a motor vehicle having a visual route comparison feature that is useful in assisting the vehicle operator in determining a preferred travel route from analysis of multiple visual image choices.

It is another aspect of the present disclosure to provide a visual display in association with a navigation system showing real-time traffic camera images associated with alternative routes on a side-by-side basis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations such that the drawings are not intended to limit the scope or interpretation of the present disclosure. Accordingly, the above aspects, as well as other aspects, features and advantages of the present disclosure, will be understood from the following detailed description with reference to the drawings wherein.

DETAILED DESCRIPTION

Example embodiments will now be described more fully with reference to the accompanying drawings.

One or more example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In addition, the terminology used herein is only for the purpose of describing particular example embodiments and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. Furthermore, the method steps, processes, and operations described herein are not to be construed as necessarily requiring their performance in the particular order discussed or illustrated, unless specifically identified as an order of performance. It is also to be understood that additional or alternative steps may be employed.

The present disclosure is generally directed to a navigation system for motor vehicles and a method associated with such a navigation system for providing real-time images from traffic cameras to the on-board visual display. The real-time images can be taken from traffic cameras located along one or more travel route determined by the navigation system based on a destination inputted by the vehicle operator. The images generated by such traffic cameras are often made available by the transportation authorities and the present disclosure is directed to providing such visual images to the vehicle operator in a side-by-side comparison of alternative routes. As such, the vehicle operator is provided a comparison display of images from traffic cameras associated with at least two different routes to facilitate selection of a preferred route. The side-by-side visual comparison eliminates the need to switch between independent display screens for each route.

Figure 1:
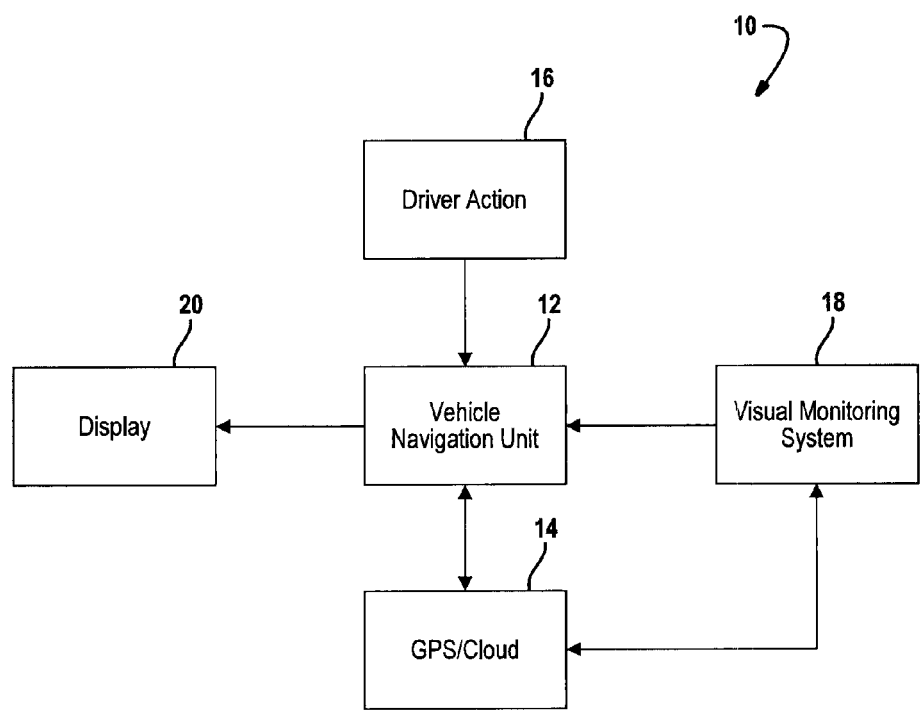
FIG. 1 is a block diagram of a vehicular navigation system in accordance with the present disclosure.

With particular reference to FIG. 1 of the drawings, a block diagram of a vehicle information system adapted for use with a motor vehicle is generally identified by reference numeral 10. Vehicle information system 10 is shown to generally include, or be associated with, a navigation/radio unit 12 of the type in communication with a global positioning system (GPS) or cloud-based data system 14. The block, identified as "driver action" 16, indicates the input of information and/or actions delivered and/or transmitted to navigation unit 12 based on some type of action by the vehicle operator. Such information/action can include, without limitation, the identity of a desired destination location which is inputted via a voice command or a driver-initiated device (i.e., keypad, touchscreen, etc.) in a format readable by navigation unit 12. Vehicle information system 10 can further include, or be associated with, a visual monitoring system 18 which functions to continuously locate and transmit real-time visual images from traffic cameras directly or through GPS/cloud 14. This information generated by visual monitoring system 18 is utilized to provide a side-by-side comparison of visual images to an on-board display screen 20 for use by the vehicle operator to compare alternative routes.

Figure 2:
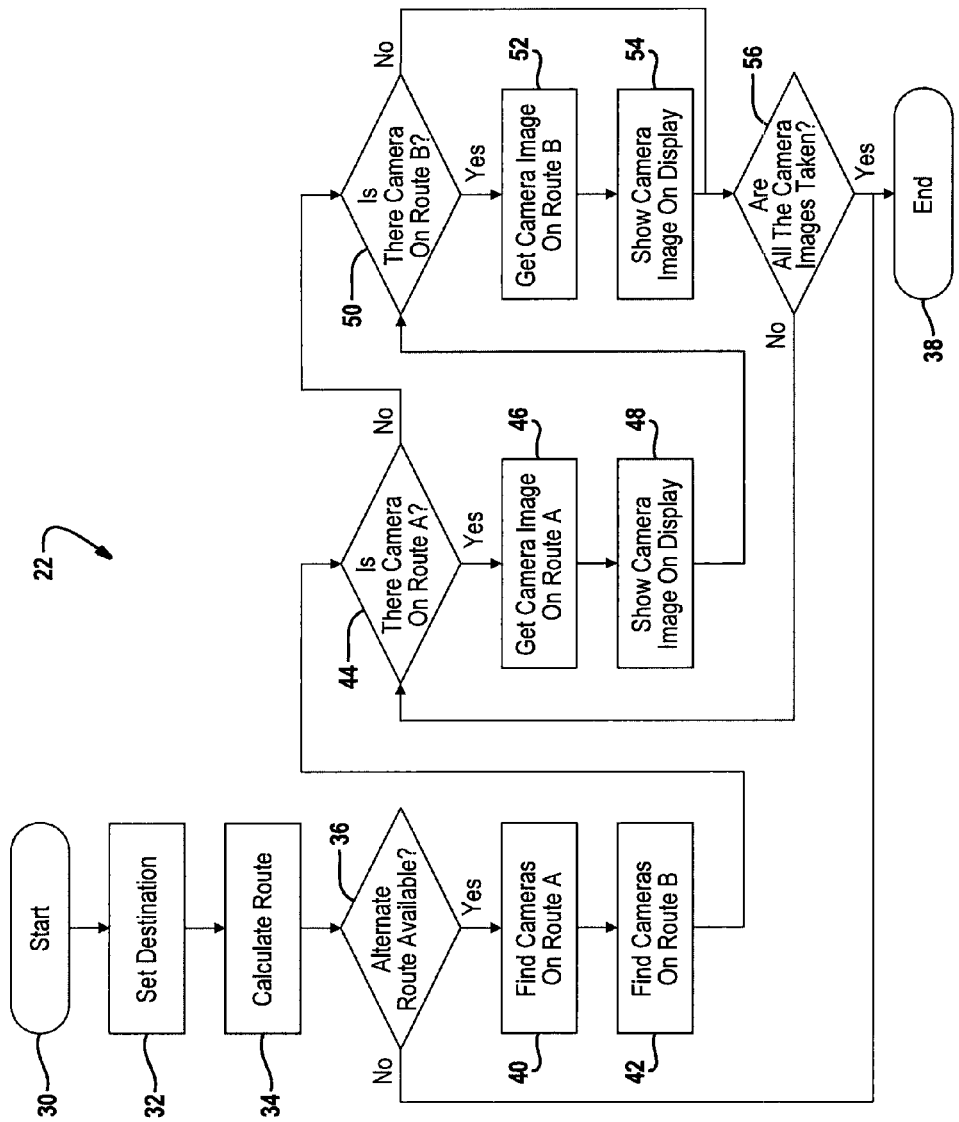
FIG. 2 is a flow chart illustrating a method for adding data relating to real-time visual images of traffic conditions along at least two alternative routes to the display of the navigation system for use by the vehicle operator of the motor vehicle.

Referring now to FIG. 2, a process flow chart 22 detailing a control sequence of steps for a method of locating and displaying real-time visual images from traffic cameras in association with vehicular information system 10 is shown. As noted, navigation unit 12 is of the type capable of permitting a vehicle operator of the motor vehicle to input or "set" data relating to a destination and subsequently outputting one or more available routes to visual display 20. In this regard, step 30 indicates a start point of control sequence 22 and step 32 indicates the action of the vehicle operator inputting information into navigation unit 12 relating to a preferred destination. As noted, such destination information can be set by voice commands, manipulation of a graphical interface or a combination thereof.

At step 34, navigation unit 12 calculates a first route (hereinafter "route A") to the set destination. Such a route calculation is well known in the navigation art and can be based on information relating to roads, traffic conditions, estimated travel time, as well as other available data points, At step 36, a determination is made whether a second or alternative route (hereinafter "route B") is available to the set destination. If no alternative route is determined to be available, then control sequence 22 moves to an end step identified by block 38. However, if an alternative route to the set destination is determined to be available, action is taken by visual monitoring system 18 to locate traffic cameras along the first route (route A) at step 40 and to locate traffic cameras along the second route (route B) at step 42. As noted, images from such traffic cameras are commonly made available by transportation authorities.

At step 44, a determination is made whether the search for traffic cameras from step 40 resulted in identification of any available traffic cameras along the first route. If available traffic cameras were located along the first route, visual images from these cameras are transmitted and received by navigation unit 12 at step 46 and shown on the on-board display 20 at step 48. These visual images from the traffic cameras along the first route can include both real-time photographs and video clips that can be provided with date/time stamp data to confirm the relevance of the visual images to the current traffic conditions being monitored.

If at step 44 a determination is made that no traffic cameras along the first route were located from step 40, then a determination is made at step 50 whether the search for traffic cameras from step 42 resulted in identification of any available traffic cameras along the second route. If available traffic cameras were located along the second route, visual images from such traffic cameras are transmitted by visual monitoring system 18 and received by navigation system 12 at step 52 and shown on on-board display 20 at step 54. Again, these camera images from traffic cameras along the second route can include both instantaneous photographs and real-time video clip that preferably include date/time stamp data. The visual images from the first route will be shown on the display in a side-by-side relationship to the visual images along the second route. This side-by-side display arrangements permits easy comparison by the vehicle operator of potential traffic delays associated with one or both of the first and second routes.

If at step 50, a determination is made that no traffic cameras along the second route were located from step 42, then a determination is made at step 56 whether all of the available camera images were taken. More specifically, the determination of step 56 determines whether all available images from all available traffic cameras along both the first and second routes have been taken/transmitted to navigation unit 12 since the display 20 may not be able to display more than a limited number of visual images from one or both routes at any given time. This assures that all traffic cameras found (from steps 40 and 42) have been considered. If all available camera images have been taken, then the affirmative determination from step 56 moves to end block 38 to complete control sequence 22. In contrast, a negative determination from step 56 results in control sequence 22 returning to the determination made at step 44.

Figure 3:
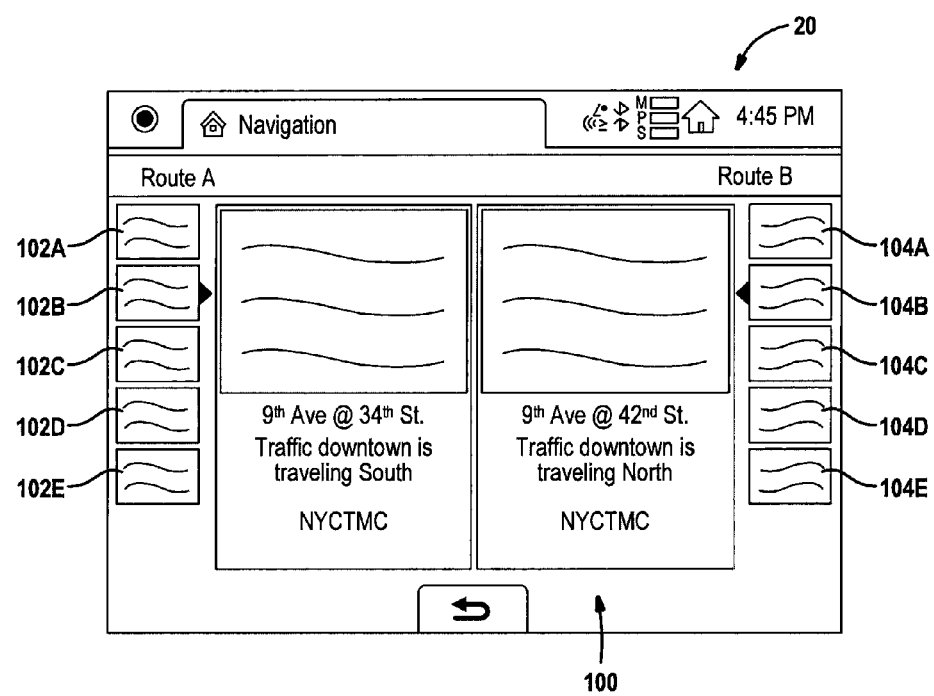
FIG. 3 is an exemplary illustration of a screen on the display of the navigation system of FIG. 1 using the method of FIG. 2.

Referring to FIG. 3, an exemplary screen shot 100 from on-board display 20 illustrates a plurality of first visual images 102A, 102B, 102C, 102D and 102E associated with the first route along the left edge, with image 102B enlarged for better evaluation by the vehicle operator. In addition, a plurality of second visual images 104A, 104B, 104C, 104D and 104E associated with the second route are illustrated along the right edge of screen shot 100, with image 104B enlarged for improved evaluation. It is contemplated that the visual images are oriented in a sequential order (i.e., top-to-bottom) in coordination with subsequent locations along the particular travel route. Furthermore, once the vehicle has passed a particular traffic camera, its image is deleted and screen display 100 is updated to add the next sequential traffic camera associated with one or both of the first and second routes.

The foregoing description of the exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for providing visual images of traffic conditions to an operator of a motor vehicle, the method comprising the steps of:

determining a current location of the motor vehicle;
setting a destination into a navigation unit;
calculating a first route from the current location to the destination;
determining a second route from the current location to the destination;
obtaining visual images from traffic cameras located along the first and second routes; and
displaying the visual images from the traffic cameras along the first route in a side-by-side relationship to the visual images from the traffic cameras along the second route to permit the operator to make a visual comparison; wherein
the second route is an alternate route from the current location to the destination which is different than the first route.

2. The method of claim 1 wherein the step of obtaining visual images includes locating the traffic cameras along at least one of the first and second routes and transmitting the visual images to the navigation unit.

3. The method of claim 1 wherein only visual images from the first route are displayed if it is determined that no second route is available.

4. The method of claim 1 further comprising the step of the operator selecting one of the first and second routes based on the comparison of the visual images.

5. The method of claim 1 wherein the visual images from the traffic cameras along the first route are displayed sequentially along one edge of a display screen, and wherein the visual images from the traffic cameras along the second route are displayed sequentially along an opposite edge of the display screen.

6. The method of claim 5 wherein the visual images associated with the first route include a plurality of first photographs or first video clip transmitted from the traffic cameras located along the first route, and wherein the visual images associated with the second route include a plurality of second photographs or second video clips transmitted from the traffic cameras located along the second route.

7. The method of claim 5 wherein the visual images are deleted from the display screen when the motor vehicle has travelled passed a corresponding one of the traffic cameras along the route.

8. A method for providing visual images of traffic conditions to an operator of a motor vehicle, the method comprising the steps of:

determining a current location of the motor vehicle
providing a navigation system having an on-board display screen;
setting a destination into the navigation system;
determining first and second routes from the current location to the destination;
locating traffic cameras along the first and second routes;
transmitting visual images from the traffic cameras along the first and second routes to the navigation system;
displaying the visual images from the traffic cameras along the first route on a first portion of the display screen; and
displaying the visual images from the traffic cameras along the second route on a second portion of the display screen; wherein
the second route is an alternate route from the current location to the destination which is different than the first route.

9. The method of claim 8 wherein the vehicle operator compares the visual images associated with the first and second routes and selects a preferred route therefrom.

10. The method of claim 9 wherein the visual images associated with the first route include a plurality of first photographs or first video clip transmitted from the traffic cameras located along the first route, and wherein the visual images associated with the second route include a plurality of second photographs or second video clips transmitted from the traffic cameras located along the second route.

11. The method of claim 8 wherein the first portion of the display screen is oriented in a side-by-side relationship to the second portion of the display screen.

12. The method of claim 8 wherein the visual images are deleted from the display screen when the motor vehicle has travelled passed a corresponding one of the traffic cameras.

* * * * *